US012158527B2

(12) United States Patent
Kishimoto (10) Patent No.: US 12,158,527 B2
(45) Date of Patent: Dec. 3, 2024

(54) REFERENCE STATION WITH HIGH PRECISION INDEPENDENT POSITIONING FUNCTION (71) Applicant: Magellan Systems Japan, Inc., Hyogo (JP)

(72) Inventor: Nobuhiro Kishimoto, Hyogo (JP)

(73) Assignee: Magellan Systems Japan, Inc., Amagasaki (JP)

(*) Notice: Subject to any disclaimer, the term of this patent is extended or adjusted under 35 U.S.C. 154(b) by 95 days.

(21) Appl. No.: 17/353,577

(22) Filed: Jun. 21, 2021

(65) Prior Publication Data

US 2021/0341629 A1 Nov. 4, 2021

Related U.S. Application Data (63) Continuation of application No. PCT/IB2019/050800, filed on Jan. 31, 2019.
(Continued)

(51) Int. Cl.
*G01S 19/07* (2010.01)
*G01S 19/41* (2010.01)
(Continued)

(52) U.S. Cl.
CPC ............... *G01S 19/07* (2013.01); *G01S 19/41* (2013.01); *G01S 19/04* (2013.01); *G01S 19/43* (2013.01)

(58) Field of Classification Search
CPC .......... G01S 19/07; G01S 19/41; G01S 19/04; G01S 19/43; G01S 19/03
(Continued)

(56) References Cited

U.S. PATENT DOCUMENTS 6,380,888 B1  4/2002 Kucik
6,961,018 B2  11/2005 Heppe et al.
(Continued)

FOREIGN PATENT DOCUMENTS

| CN | 108710140 A | 10/2018 |
|----|-------------|---------|
| WO | 2018/083803 | 5/2018 |
| WO | 2018/092193 | 5/2018 |

OTHER PUBLICATIONS

International Search Report from International Application No. PCT/IB2019/050800 dated Sep. 25, 2019.
(Continued)

*Primary Examiner* — Chuong P Nguyen
(74) *Attorney, Agent, or Firm* — Beyer Law Group LLP (57) ABSTRACT

A reference station includes a GNSS antenna configured to receive a plurality of GNSS signals including augmentation information, and a GNSS receiver having a positioning processor, a signal processor, and a signal transmitter. The positioning processor calculates a current position of the reference station based on received GNSS signals including the augmentation information without using position information of another reference station or error correction information sent via a non-GNSS satellite communication link, and thus the reference station can be independently installed at a desirable location without surveying or measuring the desirable location. The signal processor generates error correction information including the current position of the reference station in a predetermined data format such as RTCM or CMR, based on the received GNSS signals. The signal transmitter transmits the error correction information via a communication link, allowing rovers to perform centimeter-level RTK positioning using the current position of the reference station.

20 Claims, 6 Drawing Sheets

Related U.S. Application Data (60) Provisional application No. 62/788,489, filed on Jan. 4, 2019.

(51) Int. Cl.
*G01S 19/04* (2010.01)
*G01S 19/43* (2010.01)

(58) Field of Classification Search
USPC ............ 342/357.44, 357.24, 357.4, 357.26
See application file for complete search history.

(56) References Cited

U.S. PATENT DOCUMENTS

| | | | |
|---|---|---|---|
| 7,400,294 B2* | 7/2008 | Whitehead | G01S 19/072 342/357.44 |
| 8,077,085 B2* | 12/2011 | Huang | G01S 19/41 342/357.46 |
| 8,983,685 B2 | 3/2015 | Dai et al. | |
| 9,250,327 B2* | 2/2016 | Kelley | G01S 19/071 |
| 9,903,957 B2* | 2/2018 | Wallace | G01S 19/41 |
| 10,524,226 B2* | 12/2019 | Chen | H04W 64/003 |
| 10,782,417 B2 | 9/2020 | Cash et al. | |
| 10,802,160 B2 | 10/2020 | Dai et al. | |
| 10,830,905 B2* | 11/2020 | Cash | G01S 19/44 |
| 11,131,774 B2 | 9/2021 | Miya et al. | |
| 11,156,724 B2* | 10/2021 | Kishimoto | G01S 19/071 |
| 11,175,411 B2* | 11/2021 | Miya | G01S 19/074 |
| 11,209,549 B2 | 12/2021 | Gentry | |
| 11,378,696 B2 | 7/2022 | Fujita et al. | |
| 11,378,699 B2* | 7/2022 | Segal | G01S 19/073 |
| 11,624,838 B2* | 4/2023 | Fine | G01S 19/30 342/352 |
| 11,693,120 B2* | 7/2023 | Angelo | G01S 19/072 342/357.44 |
| 11,693,125 B2* | 7/2023 | Kozlov | G01S 19/071 342/357.27 |
| 11,796,687 B2* | 10/2023 | Wang | G01S 19/43 |
| 2005/0110676 A1 | 5/2005 | Heppe et al. | |
| 2007/0085734 A1* | 4/2007 | Whitehead | G01S 19/072 342/357.44 |
| 2012/0029810 A1 | 2/2012 | Dai et al. | |
| 2014/0253369 A1* | 9/2014 | Kelley | G01S 19/074 342/175 |
| 2015/0309177 A1* | 10/2015 | Wallace | G01S 19/43 342/357.42 |
| 2017/0269216 A1 | 9/2017 | Dai et al. | |
| 2017/0299728 A1 | 10/2017 | Lie et al. | |
| 2018/0106906 A1 | 4/2018 | Mikami et al. | |
| 2018/0210089 A1 | 7/2018 | Wang et al. | |
| 2018/0306928 A1 | 10/2018 | Gentry | |
| 2019/0110270 A1* | 4/2019 | Chen | G01S 19/15 |
| 2019/0317224 A1* | 10/2019 | Miya | G01S 19/08 |
| 2021/0318446 A1* | 10/2021 | Kishimoto | G01S 19/05 |
| 2022/0283314 A1* | 9/2022 | Luo | G01S 19/07 |
| 2023/0062246 A1* | 3/2023 | Wang | G01S 19/41 |

OTHER PUBLICATIONS

Written Opinion from International Application No. PCT/IB2019/050800 dated Sep. 25, 2019.
International Search Report from International Application No. PCT/IB2020/054235 dated Jun. 25, 2020.
Written Opinion from International Application No. PCT/IB2020/054235 dated Jun. 25, 2020.
International Preliminary Report on Patentability from International Application No. PCT/IB2019/050800 dated Jun. 16, 2021.
Taiwanese First Office Action from Taiwanese Application No. 109115730 dated Jun. 28, 2023 with English translation.
International Preliminary Report on Patentability from International Application No. PCT/IB2020/054235 dated Nov. 16, 2021.
Office Action from U.S. Appl. No. 17/354,720 dated Apr. 17, 2023.
Final Office Action from U.S. Appl. No. 17/354,720 dated Nov. 24, 2023.
Notice of Allowance from U.S. Appl. No. 17/354,720 dated Aug. 14, 2024.
European Examination Report from European Application No. 20725226.3-1206 dated Jun. 6, 2024.

* cited by examiner

REFERENCE STATION WITH HIGH PRECISION INDEPENDENT POSITIONING FUNCTION

CLAIM OF PRIORITY

This application is a Continuation of International Application No. PCT/IB2019/050800 filed Jan. 31, 2019, which claims priority to U.S. Provisional Patent Application No. 62/788,489, filed on Jan. 4, 2019. Each application is hereby incorporated by reference.

BACKGROUND OF THE INVENTION

1. Field of the Invention

The present invention relates to GNSS reference stations. More specifically, the present invention relates to a GNSS reference station having high precision independent positioning function such as Precise Point Positioning-Real Time Kinematic (PPP-RTK) or Precise Point Positioning (PPP) along with conventional correction data (such as RTCM, CMR, etc.) output.

2. Description of the Related Art

Global Navigation Satellite Systems (GNSS) available today include United States Global Positioning System (GPS), Russian Global Orbiting Navigation Satellite System (GLONASS), European Union's Galileo, China's regional BeiDou Satellite Navigation System (BDS, formerly known as Compass), and Japanese Quasi-Zenith Satellite System (QZSS).

In conventional relative positioning techniques such as Real Time Kinematic (RTK) positioning, Differential GNSS (DGNSS) technique, and the like, it is necessary to have the precise position (coordinates) of a reference station so as to generate error correction information such as pseudo-range correction (PRC) information to improve positioning accuracy. The PRC information created at the reference station is provided via communication links, such as a radio beacon, Networked Transport of RTCM via. Internet Protocol (NTRIP), Digital Multimedia Broadcasting (DMB), Radio Date System (RDS), FM data Radio Channel (DARC), etc. For example, Radio Technical Commission for Maritime Services (RTCM) provides a transmission standard that defines the data structure for differential correction information for a variety of differential correction applications.

The more accurate the position of a reference station, the higher the accuracy of positioning of a mobile station (rover receiver) using the error correction information generated by the reference station, i.e., the positioning solution becomes closer to the absolute position. Accordingly, it is necessary to conduct survey work with a high degree of precision before installing a reference station with its precise position (initial-term coordinates). The term "initial-term coordinates" may be used to indicate the coordinates at the time of installation of the reference station or that of a previous survey work performed in a certain year. In addition, since the position of the reference station may be changing due to diastrophism or crustal deformation, it is also necessary to continuously measure the installation position of the reference station in order to obtain its real-time position (current-term coordinates), since such a real-time position of the reference station is necessary for any mobile station or rover receiver to obtain its absolute position from its relative position with respect to the reference station.

The technique that continuously monitors and corrects the difference between the initial-term coordinates and the current-term coordinates is called dynamic correction. For example, GNSS Earth Observation network System (GONET) in Japan includes a plurality (currently about 1,300) of electronic reference points (reference stations) and a single control center. The signal from the GNSS satellite is continuously observed by each of the reference stations for 24 hours, and the data acquired at the reference stations is sent to Geodetic Observation Center of the GSI (Geographical Survey Institute, a.k.a. Geospatial Information Authority of Japan) as raw observation data in a common format independent of receivers called RINEX (Receiver Independent Exchange Format). The position of each reference station is obtained only after the observation data from the multiple reference stations is processed by the server computers at the Center. Then, the Center publishes the real-time position of the reference stations via the Internet, which is used by mobile stations or rovers (DGNSS users).

Conventionally, when a new reference station is installed, the location (precise position) of the new reference station is surveyed using DONSS or RTK-GNSS, by concurrently conducting real-time GNSS observation at the new reference station and another exiting reference station which precise location is known. Typically, the position is determined with the accuracy of several meters using DGNSS, and that of sub centimeters using RTK-GNSS. Due to a distance-dependent survey error, it is necessary to have such an existing reference station near the location at which the new reference station is to be installed.

It should be noted that Precise Point Positioning-Real Time Kinematic (PPP-RTK) is also referred to as Real Time Kinematic-Precise Point Positioning (RTK-PPP).

BRIEF DESCRIPTION OF THE INVENTION

A reference station that generates error correction information has a self-contained (i.e., independent) high-precision positioning function. In addition to the function of generating error correction information, the reference station simultaneously has the function of calculating and monitoring its own position with high accuracy. Contrary to conventional reference stations, the reference station in accordance with the present invention does not employ relative positioning technology (such as RTK or DGNSS) using other reference stations, but uses satellite-based high-precision independent positioning technology in order to survey and determine the precise position of the reference station itself, for example, PPP using GNSS such as QZSS.

In other words, while a conventional reference station does not know its current precise position since its initially-surveyed/measured position will change in time due to diastrophism or crustal deformation, as mentioned above, the reference station in accordance with the present invention independently obtains its current and updated precise position based on GNSS signals, thereby eliminating necessity of initial survey and/or relative-positioning process for installation, and re-survey or re-measurement of the installation position for update thereof.

In accordance with one embodiment of the present invention, a reference station is equipped with a GNSS antenna configured to receive a plurality of GNSS signals and a GNSS receiver. The GNSS receiver includes a positioning processor capable of calculating a current position of the reference station based on received GNSS signals without using position information of another reference station, a signal processor configured to generate error correction information in a predetermined data format based on the received GNSS signals, where the error correction information includes the current position of the reference station, and a signal transmitter configured to transmit the error correction information via a communication link. The plurality of GNSS signals may include GNSS signals having centimeter-level augmentation information. The predetermined data format may be in accordance with RTCM standard, CMR standard, and the like.

The positioning processor may continuously calculate and thereby monitor the current position of the reference station.

In accordance with one embodiment of the present invention, the GNSS receiver of the reference station may further include a position memory that stores position information of the reference station. The positioning processor continuously calculates the current position of the reference station, and updates the position information in the memory with the current position. The signal processor is further configured to generate the error correction information using the position information stored in the position memory.

In accordance with one embodiment of the present invention, the positioning processor may calculate a running average of the current position obtained during a predetermined time period, thereby obtaining an averaged position of the reference station. The averaged position is stored in the memory as the position information.

The current position may be current coordinates of the reference station, and the current coordinates may be geocentric coordinates.

In accordance with one embodiment of the present invention, the positioning processor performs Precise Point Positioning (PPP) or Precise Point Positioning-Real Time Kinetic (PPP-RTK).

Another aspect of the present invention provides a method for installing a reference station at a precise location. According to this method, the reference station including a GNSS receiver having a positioning processor, an error correction signal processor, and a transmitter is provided. The reference station is installed at a desirable location without surveying or measuring the desirable location, and a plurality of GNSS signals are received from a plurality of GNSS satellites via an antenna of the reference station. Positioning is performed using the GNSS receiver to calculate a current position of the reference station based on the received GNSS signals, without using position information of another reference station or error information sent via a non-satellite communication link. Error correction information is generated in a predetermined data format based on the results of the positioning, where the error correction information includes the current position of the reference station. Then, the error correction information is transmitted via a communication link.

The plurality of GNSS signals may include GNSS signals having centimeter-level augmentation information. The predetermined data format may be in accordance with standard correction data format of RTCM or CMR.

In accordance with one embodiment of the present invention, the positioning is continuously performed so as to monitor the current position of the reference station.

In accordance with one embodiment of the present invention, a position memory that stores position information of the reference station may be provided. The positioning is continuously performed to obtain the current position of the reference station, and the position information in the memory is updated with the current position. The error correction information may be generated using the position information stored in the position memory.

In accordance with one embodiment of the present invention, a running average may be calculated for the current position obtained during a predetermined time period, so as to obtain an averaged position of the reference station. The averaged position is stored in the memory as the position information.

The current position may be current coordinates of the reference station, and the current coordinates may be geocentric coordinates. The positioning may be Precise Point Positioning (PPP) or Precise Point Positioning-Real Time Kinetic (PPP-RTK).

In accordance with the reference station according to the present invention, it is always possible to obtain the current coordinates of the reference station, and thus it is unnecessary to perform semi-dynamic correction or dynamic correction.

Also, it is possible to install a new reference station in a short time with high accuracy. Even if there are no other reference stations in the vicinity, the reference station according to the present invention can be installed and its precise position is obtained. Once the reference station is installed, maintenance such as re-surveying the position is unnecessary thereafter.

In particular, when the reference station according to the present invention is employed as a portable base station used by several working sites, it is not required to install the reference station at exactly the same position each time in each working site. It is possible to install the reference station at an arbitrary position where the environment is more suitable for the satellite positioning.

Since re-surveying for the installation of the reference station becomes unnecessary and thus the reference station can be installed at any suitable position, it is possible to set up the reference station to provide a shorter baseline for a rover which performs its own GNSS positioning using the reference station, thereby improving the positioning accuracy. For example, the reference station can be installed in any ideal place with the open sky and closer to the work site.

Furthermore, since the reference station can be installed at any ideal or suitable location, there is no need to use virtual reference station (VRS), and thus the operation cost can be reduced.

BRIEF DESCRIPTION OF THE DRAWINGS

The present invention is illustrated by way of example, and not by way of limitation, in the FIGS. of the accompanying drawings and in which like reference numerals refer to similar elements and in which.

DETAILED DESCRIPTION OF EMBODIMENTS OF THE INVENTION

The present invention provides a reference station that generates error correction information with a self-contained high-precision positioning function such that the reference station continuously calculating and monitoring its own position with high accuracy. "Self-containing" means that it does not employ relative positioning technology (such as RTK or DGNSS) which requires position information (known precise position) of other reference station(s). That is, contrary to conventional reference stations, the reference station in accordance with the present invention uses satellite-based high-precision positioning technology such as PPP or PPP-RTK using GNSS such as QZSS, without relying on other error correction information or position information received via non-satellite communication links such as the Internet.

Figure 1:
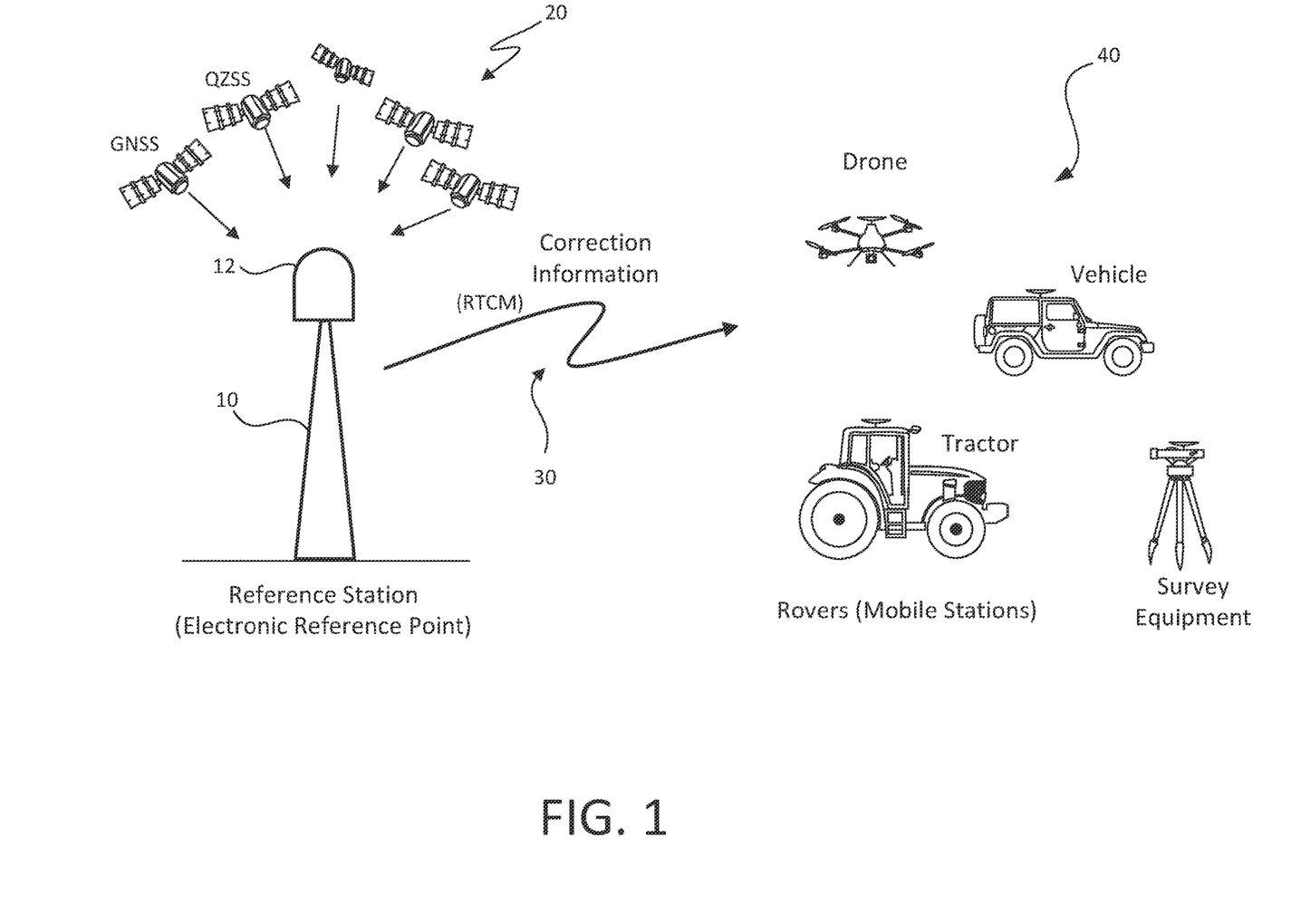
FIG. 1 is a schematic diagram illustrating an implementation of a reference station in accordance with one embodiment of the present invention.

FIG. 1 schematically illustrates an example in which the reference station 10 in accordance with one embodiment of the present invention is implemented. The reference station 10 may be an electronic reference point installed at a fixed location. The fixed location may be a permanent location or a temporary location. The reference station 10 may be a potable reference station used in different work sites as needed.

As shown in FIG. 1, the reference station 10 receives a plurality of GNSS signals from a plurality of GNSS satellites 20. The plurality of GNSS satellites 20 are at least five GNSS satellites, and may include GNSS satellites transmitting GNSS signals having centimeter-level augmentation (CLA) information therein. For example, QZSS satellites transmit L6 signals having such centimeter-level augmentation information under the Centimeter Level Augmentation Information Service (CLAS) and Multi-GNSS Advanced Demonstration tool for Orbit and Clock Analysis (MADOCA). The GNSS satellites which are capable of transmitting the CLA information may be referred to as CLAS Satellites.

The reference station 10 performs positioning based on the received GNSS signals and generates error correction information 30 including the current position of the reference station 10, and transmits the error correction information 30 via a communication link. For example, such error correction information 30 may use RTCM data format or Compact Measurement Record (CMR) message format. The reference station 10 may also generate and transmit GNSS observation data.

As the error correction information 30 includes the precise position (current coordinates) of the reference station 10, as explained below, rovers (mobile stations) 40 such as vehicles, drones, or tractors, and other survey equipment (GNSS users) which also receive the GNSS signals are able to calculate and determine their positions using the error correction information 30 and the precise position of the reference station 10 included therein. That is, such GNSS users (rovers 40) perform relative GNSS positioning so as to obtain their current position based on the current precise position of the reference station 10 by calculating their relative position with respect to the current precise position of the reference station 10.

It should be noted that since a distance (baseline) between the reference station 10 and the rover(s) 40 is negligible compared with the distance from the GNSS satellites 20, it is assumed that the rover(s) 40 can use the same error correction information 30 as that for the position of the reference station 10. Thus, the greater the distance between the reference station 10 and the rover(s) 40, the lesser the accuracy of the relative GNSS positioning performed at the rover(s) 40. For example, the centimeter-level accuracy may be achieved up to the distance of about 10 km. It may be desirable to perform such relative GNSS positioning within 5 km range from the reference station 10 if the rover receiver uses one signal frequency (for example, L1), or within 20 km if the rover receiver uses two signal frequencies (for example, L1 and L2).

Accordingly, since the reference station 10 can easily be installed at a location close to the rover(s) 40, for example, several tens of meters, it is possible for the rover(s) 40 to use a simple radio or wireless receiver to receive the error correction information 30 from the reference station 10, without using the Internet, mobile phone communication system, or other public communication systems, which would require more complicated receivers. Thus, it is possible to reduce the cost of the receiver of the rovers 40, yet achieving the precise centimeter-level positioning of the rover(s) 40.

Since the reference station 10 is able to obtain its own current precise position (installation location) solely based on the GNSS signals received from the GNSS satellites 20, there is no need to perform survey work for the installation location prior to the installation; conduct initial RTK positioning using an existing reference station within a certain distance, which also requires the Internet connection or the like to receive error correction information for the exiting reference station (to obtain the current position of the exiting reference station); or re-survey the installation location to update the current location after the installation. Accordingly, the reference station 10 eliminates many procedural and locational requirements, limitations, and burdens.

It is also possible to select an ideal installation location for the reference station 10 to receive the GNSS signals, avoiding obstacles such as trees, tall buildings, and other structures blocking the signal paths from the GNSS satellites. As the number of GNSS satellites that use the centimeter-level augmentation (CLA) information may be limited (for example, 11 satellites for CLAS), it is desirable and also possible to set up the reference station 10 at such a location that the GNSS signals including the CLA information are well received so as to perform the precise point positioning, That is, the reference station 10 can be installed at a position having a good view of the GNSS satellites designated for CLAS among all visible GNSS satellites. The rovers 40 on the other hand can use the error correction information 30 from the reference station 10 while performing multi-GNSS RTK positioning using a larger number of available GNSS satellites (including GPS, etc.) from among all visible GNSS satellites.

Figure 2A:
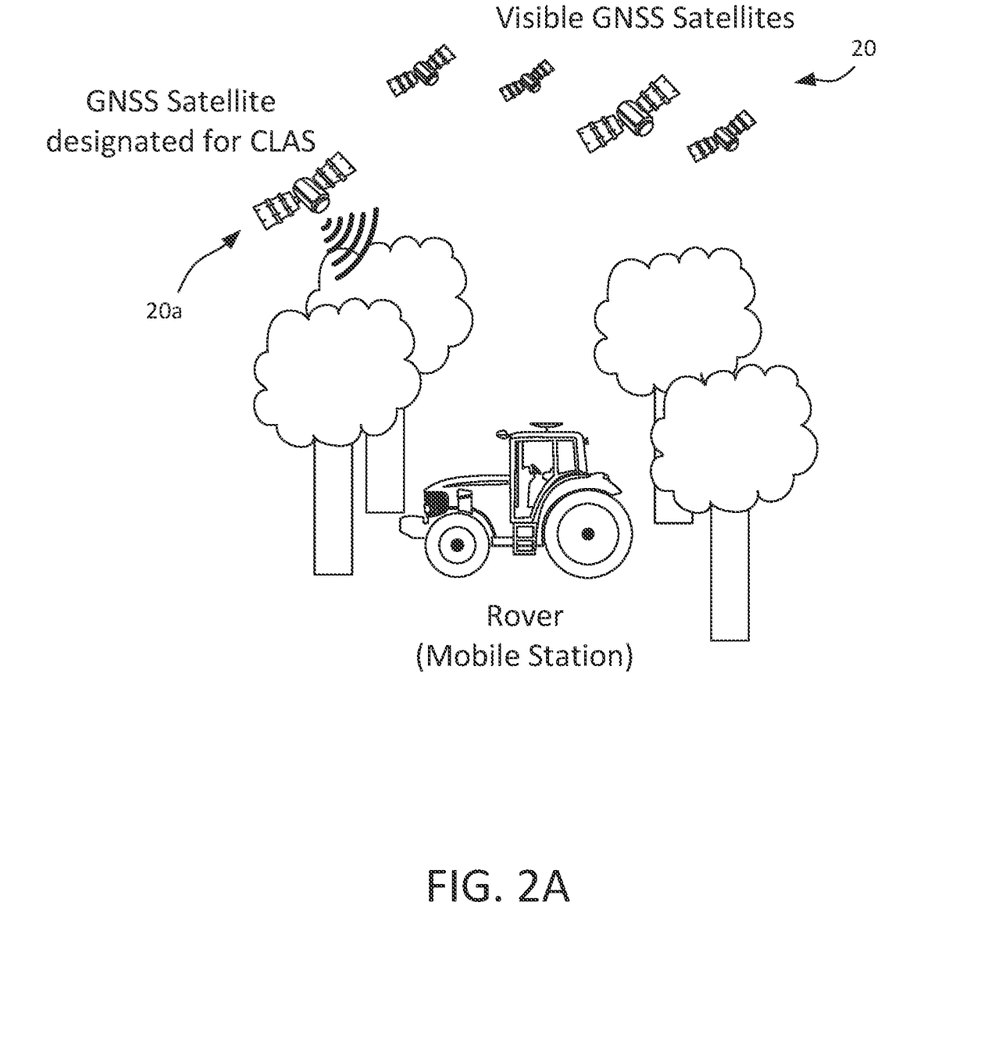
FIG. 2A is a schematic diagram illustrating a conventional Precise Point Positioning by a rover in an environment, with obstructing structures.
Figure 2B:
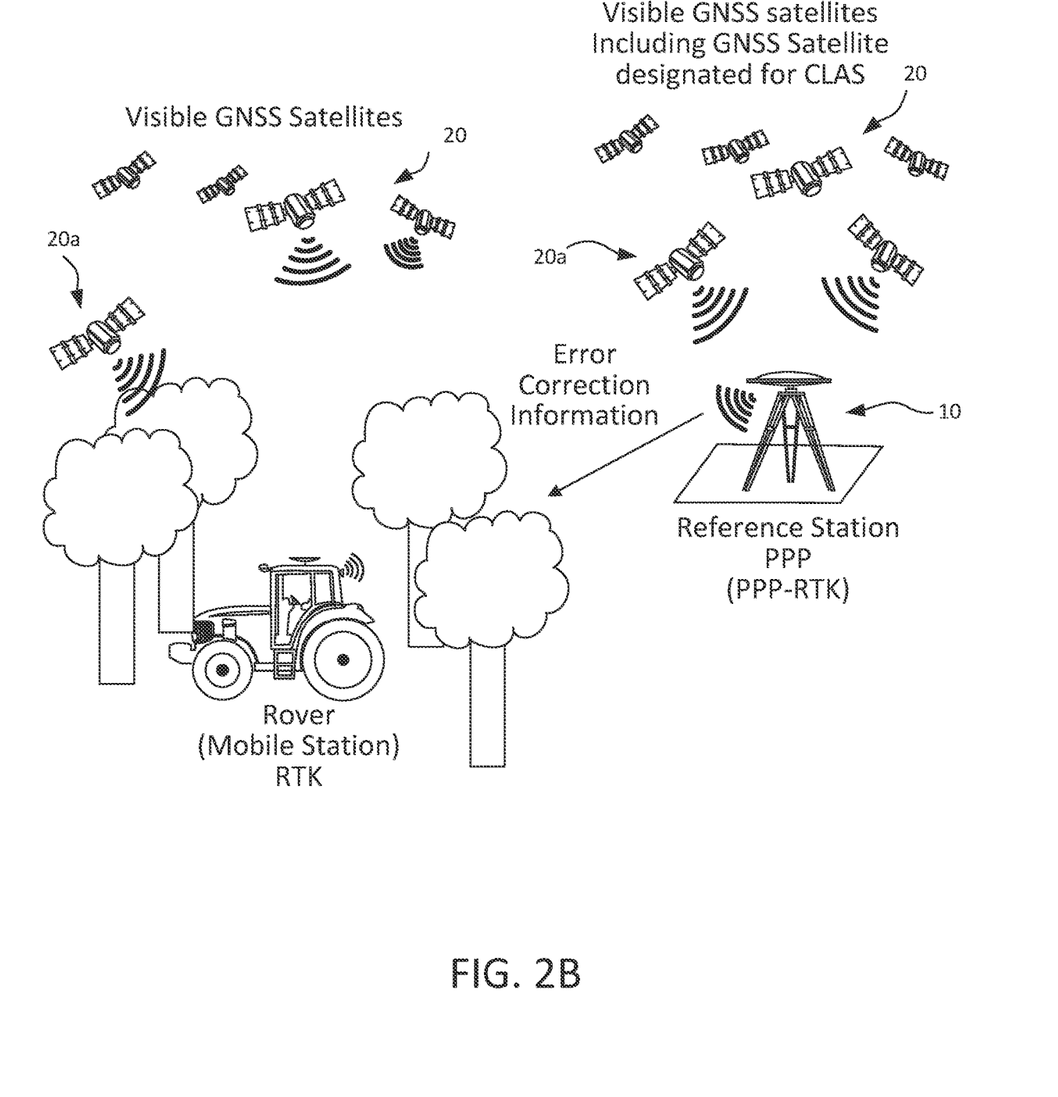
FIG. 2B is a schematic diagram illustrating an example in which a rover in an environment with obstructing structures is performing RTK using error correction information from the reference station in accordance with one embodiment of the present invention.

For example, conventionally, it may be possible for each rover (such as tractor or construction machine such as a bulldozer) to perform precise point positioning to obtain its precise (centimeter-level) position in order to perform automatic operation in an agriculture or construction site, and the like. However, surrounding structures such as tall trees or buildings may obstruct the view of the GNSS satellites using CLA information (for example, GNSS satellite 20a), making it difficult for the rover to fix the necessary GNSS signals, as shown in FIG. 2A. By installing the reference station 10 in accordance with the present invention at an open area in the vicinity of the agriculture or construction site, as shown in FIG. 2B, the rover can switch its positioning to RTK using the error correction information from the reference station 10 (including the current precise position of the reference station). In such a case, the rover can utilize a larger number of GNSS signals available from visible GNSS satellites 20 to perform the relative-positioning, thereby achieving the centimeter-level positioning more stably.

As the reference station 10 is set up in a desirable location such as an open area, it can receive GNSS signals from GNSS satellites 20a designated for CLA as well as other visible GNSS satellites 20. The reference station 10 generates and transmits error correction information for the visible GNSS satellites 20 (including the CLA-designated GNSS satellite 20a) to the rover. Thus, although the rover in a disadvantageous location may not be able to view all of the GNSS satellites which are visible from the reference station 10, the rover still can perform RTK (relative positioning) satisfactory utilizing available GNSS satellites with respect to the reference station 10. Accordingly, the reference station 10 of the present invention makes the rover's centimeter-level positioning highly adaptable to various environments and also to changes in the environment, by combining PPP (or PPP-RTK) at the reference station 10 and RTK at the rovers utilizing the error correction information from the reference station 10.

Figure 3:
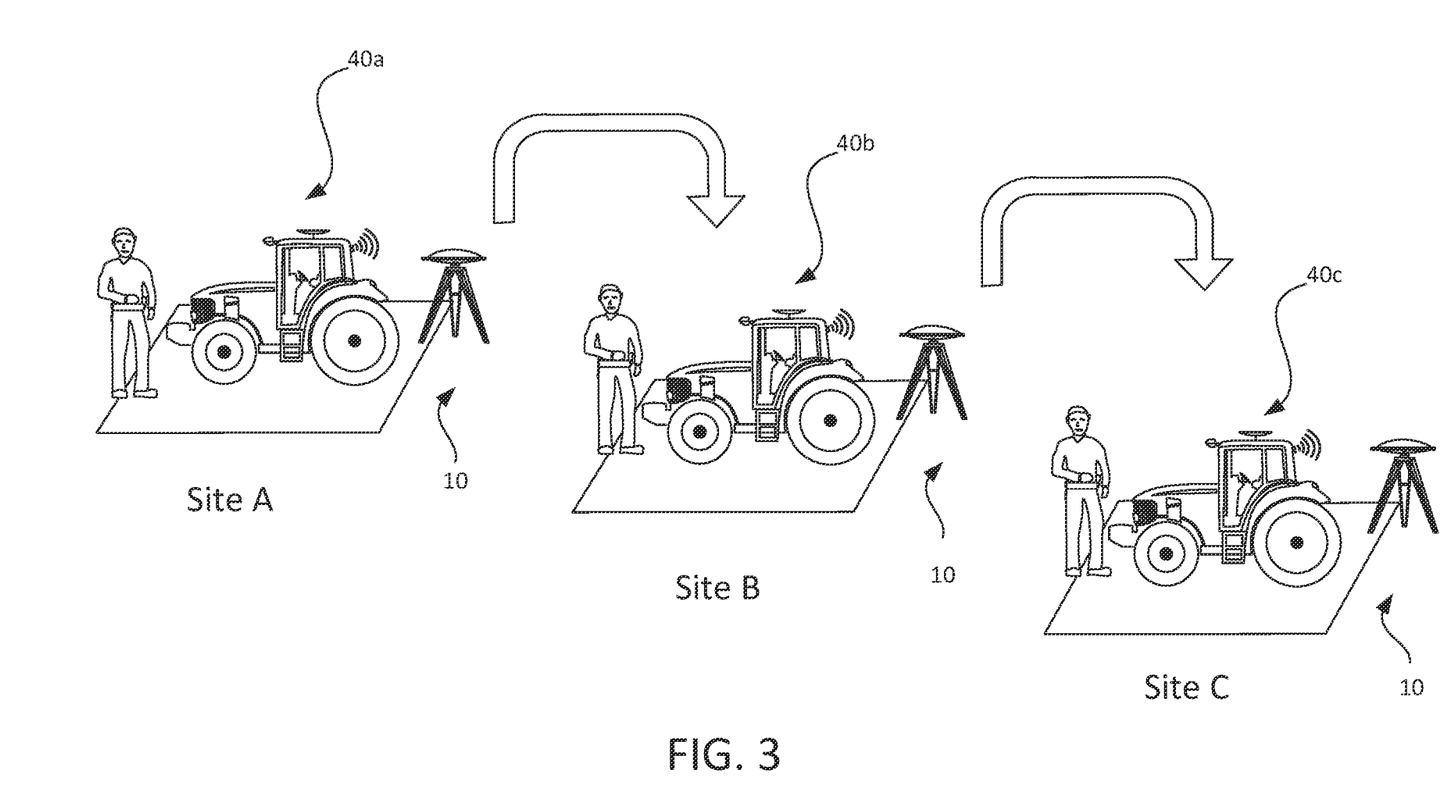
FIG. 3 is a schematic diagram illustrating an example in which a portable reference station in accordance with one embodiment is used for a plurality of work site.

In accordance with one embodiment of the present invention, the reference station 10 can be used as a temporary or potable reference station. For example, as shown in FIG. 3, the reference station 10 is installed for Site A (for example, an agricultural field or construction site) at a suitable location such that a rover 40a in Site A can perform the centimeter-level positioning (RTK) using the correction information from the reference station 10 and its current precise position A. Then, when the work in Site A is completed or the reference station 10 is not in use in Site A, the reference station 10 can be moved to Position B for Site B in which a rover 40b can utilize the reference station 10 and its error correction information to perform the centimeter-level positioning, and so on.

Figure 4:
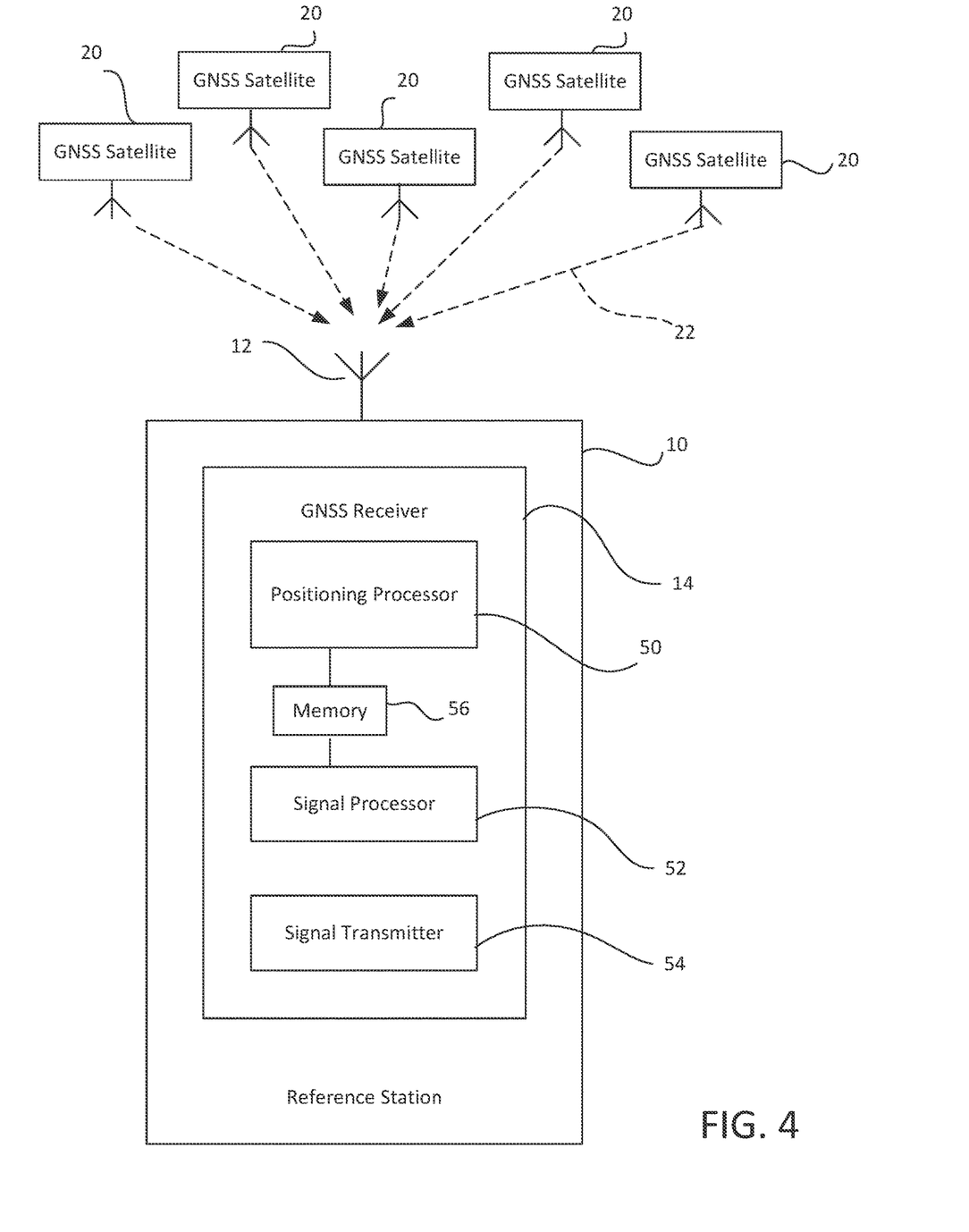
FIG. 4 is a functional block diagram schematically illustrating the reference station in accordance with one embodiment of the present invention.

FIG. 4 is a functional block diagram of the reference station 10 in accordance with one embodiment of the present invention. As shown in FIG. 4, the reference station 10 includes a GNSS antenna 12 and a GNSS receiver 14. The GNSS antenna 12 is configured to receive a plurality of GNSS signals 22 from a plurality of GNSS satellites 20, such as QZSS, GPS, and/or GLONASS. It is assumed that at least five GNNS signals 22 are received by the GNSS antenna 12 and acquired and tracked by the GNSS receiver 14. The implementation of the present invention may be configured as a computer including a CPU, a memory (RAM, ROM), and the like therein so as to have the illustrated functional blocks. These functional blocks may be realized by means of software/computer programs realizing the respective functions, but a part or the whole of them may be realized by hardware.

As shown in FIG. 4, the GNSS receiver 14 includes a positioning processor 50 capable of calculating a current position of the reference station 10 based on the received GNSS signals without using position information of another reference station. For example, the positioning processor 50 performs Precise Point Positioning (PPP) or Precise Point Positioning-Real Time Kinetic (PPP-RTK). In accordance with one embodiment of the present invention, the plurality of GNSS signals 22 include GNSS signals having centimeter-level augmentation (GLA) information such that the positioning processor 50 obtain the current position of the reference station 10 with the centimeter-level accuracy. The positioning processor 50 may continuously calculate and monitor the current position of the reference station. It should be noted the positioning processor includes a front end and other components (not shown) to process the received GNSS signals as is well understood by those of ordinary skill in the art.

As shown in FIG. 4, the GNSS receiver 14 further includes a signal processor 52 configured to generate error correction information in a predetermined data format based on the received GNSS signals processed by the positioning processor, where the error correction information includes the current position of the reference station. For example, such a predetermined format may be standard correction data format of RTCM or CMR. The signal processor 52 may also generate conventional GNSS observation data.

The GNSS receiver 14 also includes a signal transmitter 54 configured to transmit the error correction information via a communication link, such as a radio beacon, Networked Transport of RTCM via Internet Protocol (NTRIP), Digital Multimedia Broadcasting (DMB), Radio Date System (RDS), FM data Radio Channel (DARC), etc. The signal transmitter 54 may be provided with two or more communication links.

In accordance with one embodiment of the present invention, the GNSS receiver 14 may further include a memory 56 that stores the position information of the reference station 10. The memory 56 may be part of the positioning processor 50 or part of the signal processor 52, or may be provided separately from the positioning processor 50 and the signal processor 52, so long as the memory 56 is accessible to both of the positioning processor 50 and the signal processor 52. The positioning processor 50 continuously calculates the position of the reference station 10 so as to obtain current position of the reference station 10, and updates the position information in the memory 42 with the current position. The current position may be current coordinates of the reference station 10, and the current coordinates may be geocentric coordinates of the reference station 10. The signal processor 52 generates the error correction information using the position information stored in the memory 56 such that the error correction information always contains the updated current position of the reference station 10.

In accordance with one embodiment of the present invention, the memory 56 may store the updated position of the reference station 10 for a certain period of time during which a plurality of updates are performed. That is, the memory 56 holds a plurality of updates of the current position, and the positioning processor 50 may calculate a running average of the plurality of updates so as to obtain an averaged position (averaged current coordinates). This averaged position is stored in the memory 56 as the position information of the reference station 10 which is used by the signal processor 54 to generate the error correction information. Since it is a running average, the averaged position is also updated every time a new current, position (coordinates) are obtained. The time period for the running average may be 10 minutes, or more or less, for example.

Figure 5:
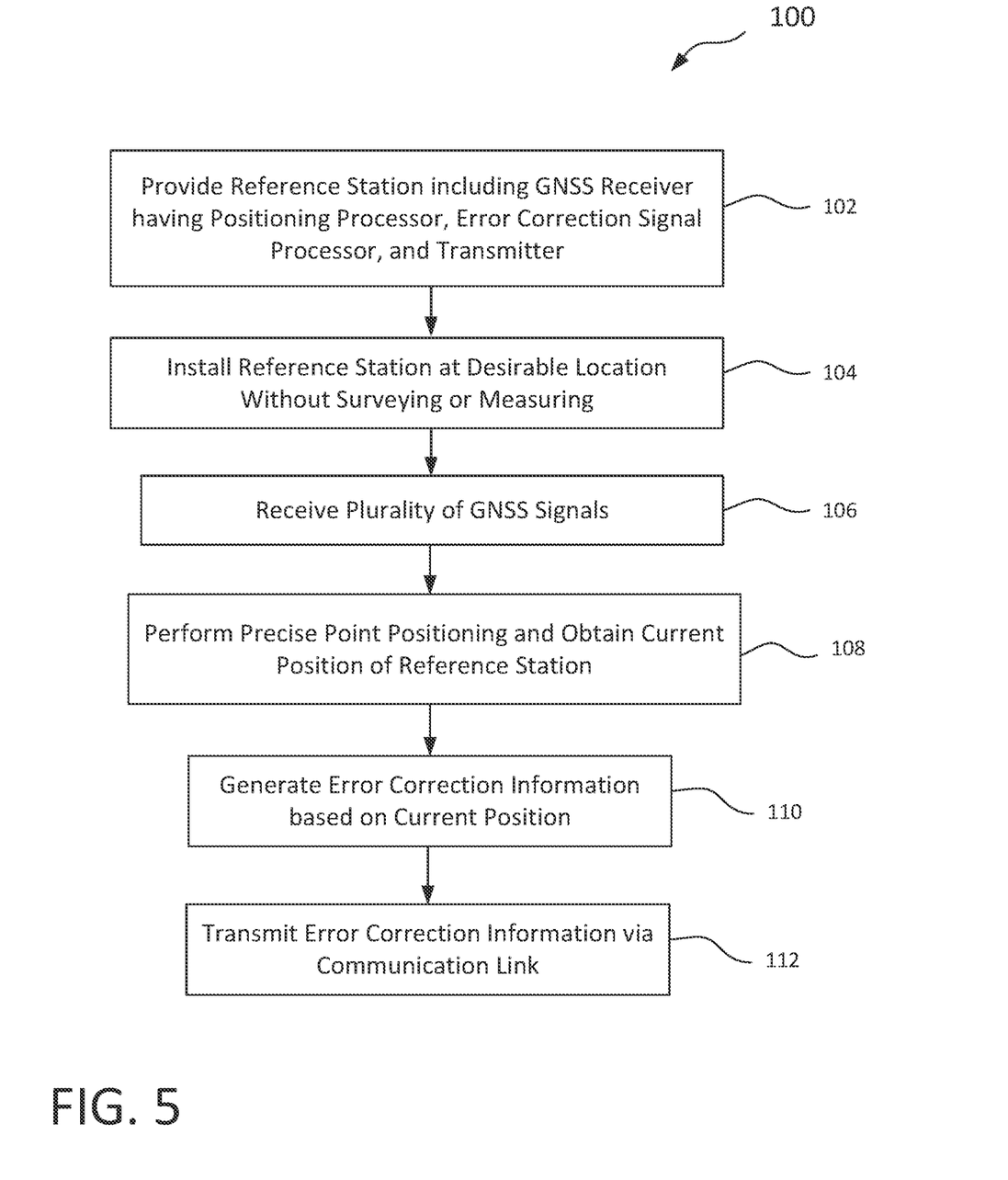
FIG. 5 is a block diagram illustrating a method for installing a reference station at a precise location without survey or measurement, in accordance with one embodiment of the present invention.

FIG. 5 shows a method 100 for installing a reference station in accordance with one embodiment of the present invention. The reference station may be the reference station 10 described above. The reference station is easily installed at a precise location without conducting a survey work. As shown in FIG. 5, the reference station including a GNSS receiver having a positioning processor, an error correction signal processor, and a transmitter is provided (102). The reference station is installed at a desirable location without surveying or measuring the desirable location (104), and a plurality of GNSS signals are received from a plurality of GNSS satellites via an antenna of the reference station (106). The plurality of GNSS signals may include GNSS signals having centimeter-level augmentation information. Positioning is performed using the GNSS receiver to calculate a current position of the reference station (108). The positioning may be Precise Point Positioning (PPP) or Precise Point Positioning-Real Time Kinetic (PPP-RTK). The positioning 108 is performed based on the received GNSS signals without using position information of another reference station or error information sent via a non-satellite communication link.

Error correction information is generated (110) in a predetermined data format based on the results of the positioning. The error correction information includes the current position of the reference station. The predetermined data format may be in accordance with standard correction data format of RTCM or CMR. Then, the error correction information is transmitted via a communication link (112), thereby enabling a rover or rovers to perform a centimeter-level positioning using the error correction information with the current position of reference station.

In accordance with one embodiment of the present invention, the position information (calculated coordinates) of the reference station is stored in a position memory. The positioning may be continuously performed to obtain the current position of the reference station with a certain time interval depending on the processing time. The position information in the memory is updated with the current position such that the error correction information is generated using the updated position information stored in the position memory.

In accordance with one embodiment of the present invention, the position memory may be configured to hold a plurality of calculated coordinates for a predetermined time period. That is, a plurality of updates of the current position obtained in the predetermined time period are maintained in the position memory. In this embodiment, in the positioning process 108, a running average may be calculated for the current position obtained during the predetermined time period (the recent updates maintained in the position memory), so as to generate an averaged position of the reference station. For example, the position memory may hold a predetermined number of updates corresponding to the predetermined time period, in which the oldest update is discarded when a new update is added to the position memory. In this way, the averaged position of the reference station is generated from the predetermined number of the most recent updates. The averaged position is also stored in the memory as the position information to be used in generating the error correction information.

The current position may be current coordinates of the reference station, and the current coordinates may be geocentric coordinates, as mentioned above.

In accordance with one embodiment of the present invention, the signal processor 52 may further generate GNSS observation data including the current position of the reference station 10 and transmit the GNSS observation data to one or more control center via the signal transmitter 54. For example, when the reference station 10 is implemented as an electronic reference point as part of an observation/survey network, the signal processor 52 may provide the GNSS observation data in a suitable data format for such network.

In accordance with the reference station according to the present invention, it is always possible to obtain the current coordinates of the reference station, and thus it is unnecessary to perform semi-dynamic correction or dynamic correction.

Also, it is possible to install a new reference station in a short time with high accuracy. Even if there is no other reference station in the vicinity, the reference station according to the present invention can be installed and its precise position is obtained.

Once the reference station has been installed, maintenance such as re-surveying the position in the future is unnecessary, even if the installation position changed due to diastrophism or crustal deformation.

In particular, when the reference station according to the present invention is employed as a portable base station used by several working sites, for example, it is not required to install the reference station at exactly the same position each time in each working site. It is possible to install the reference station at an arbitrary position where the environment is more suitable for the satellite positioning.

Since re-surveying for the installation of the reference station is unnecessary and thus the reference station can be installed at any suitable position, it is possible to set up the reference station at such a position for a rover which performs its own GNSS positioning using the reference station to obtain a shorter baseline, thereby improving the positioning accuracy. For example, the reference station can be installed in any ideal place with the open sky and closer to the work site.

In addition, using the present invention, a base station (reference station) can be quickly installed in an arbitrary location where the PPP/PPP-RTK service is available, and a plurality of inexpensive L1 RTK rovers can be used in a radius of 5 km around the base station.

Furthermore, since the reference station can be installed at any ideal or suitable location, there is no need to use virtual reference station (YRS), and thus the operation cost can be reduced.

While this invention has been described in terms of several preferred embodiments, there are alterations, permutations, modifications, and various substitute equivalents, which fall within the scope of this invention. It should also be noted that there are many alternative ways of implementing the methods and apparatuses of the present invention. It is therefore intended that the following appended claims be interpreted as including all such alterations, permutations, and various substitute equivalents as fall within the true spirit and scope of the present invention.

What is claimed is:

1. A reference station comprising:
   a GNSS antenna configured to receive a plurality of GNSS signals, the plurality of GNSS signals including GNSS signals having augmentation information; and
   a GNSS receiver including:
      a positioning processor capable of calculating a current position of the reference station based on received GNSS signals including the augmentation information, without using position information of another reference station, error information sent via a communication link other than GNSS satellite communication link, or a surveyed position of the reference station;
      a signal processer configured to generate error correction information in a predetermined data format based on the received GNSS signals without using or referring to the surveyed position of the reference station, the error correction information including the calculated current position of the reference station obtained from the positioning processor as a precise position of the reference station; and a signal transmitter configured to transmit the error correction information via a communication link.

2. The reference station according to claim 1, wherein the augmentation information is centimeter-level augmentation information.

3. The reference station according to claim 1, wherein the predetermined data format is in accordance with standard correction data format of RTCM or CMR.

4. The reference station according to claim 1, wherein the positioning processor continuously calculates and thereby monitors the current position of the reference station.

5. The reference station according to claim 1, wherein the GNSS receiver further comprises:

a position memory that stores position information of the reference station, wherein the positioning processor continuously calculates the current position of the reference station, and updates the position information in the memory with the current position.

6. The reference station according to claim 5, wherein the signal processor is further configured to generate the error correction information using the position information stored in the position memory.

7. The reference station according to claim 5, wherein the positioning processor calculates a running average of the current position obtained during a predetermined time period, thereby obtaining an averaged position of the reference station, the averaged position being stored in the memory as the position information.

8. The reference station according to claim 5, wherein the current position is current coordinates of the reference station.

9. The reference station according to claim 8, wherein the current coordinates are geocentric coordinates.

10. The reference station according to claim 1, wherein the positioning processor performs Precise Point Positioning (PPP) or Precise Point Positioning-Real Time Kinetic (PPP-RTK).

11. A method for installing a reference station at a precise location, the method comprising:

providing a reference station with a GNSS receiver including a positioning processor, an error correction signal processor, and a transmitter:

installing the reference station at a desirable location without surveying or measuring the desirable location;

receiving a plurality of GNSS signals from a plurality of GNSS satellites via an antenna of the reference station installed at the desirable location, the plurality of GNSS signals including GNSS signals having augmentation information;

performing positioning using the GNSS receiver to calculate a current position of the reference station based on the received GNSS signals including the augmentation information, without using position information of another reference station, error information sent via a communication link other than GNSS satellite communication link, or a surveyed position of the reference station;

generating error correction information in a predetermined data format based on results of the positioning without using or referring to the surveyed position of the reference station, the error correction information including the calculated current position of the reference station as a precise position of the reference station; and transmitting the error correction information via a communication link.

12. The method according to claim 11, wherein the augmentation information is centimeter-level augmentation information.

13. The method according to claim 11, wherein the predetermined data format is in accordance with standard correction data format of RTCM or CMR.

14. The method according to claim 11, wherein the positioning is continuously performed so as to monitor the current position of the reference station.

15. The method according to claim 11, further comprising:

providing a position memory that stores position information of the reference station;

continuously performing the positioning to obtain the current position of the reference station; and updating the position information in the memory with the current position.

16. The method according to claim 15, wherein the error correction information is generated using the position information stored in the position memory.

17. The method according to claim 15, further comprising:

calculating a running average of the current position obtained during a predetermined time period, thereby obtaining an averaged position of the reference station; and storing the averaged position in the memory as the position information.

18. The method according to claim 15, wherein the current position is current coordinates of the reference station.

19. The method according to claim 18, wherein the current coordinates are geocentric coordinates.

20. The method according to claim 11, wherein the positioning is Precise Point Positioning (PPP) or Precise Point Positioning-Real Time Kinetic (PPP-RTK).

* * * * *